(12) United States Patent
Nakama et al.

(10) Patent No.: US 11,675,142 B2
(45) Date of Patent: Jun. 13, 2023

(54) FERRULE, FIBER-EQUIPPED FERRULE, AND METHOD FOR MANUFACTURING FIBER-EQUIPPED FERRULE

(71) Applicant: FUJIKURA LTD., Tokyo (JP)

(72) Inventors: Akihiro Nakama, Chiba (JP); Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 170 days.

(21) Appl. No.: 17/299,610

(22) PCT Filed: Sep. 17, 2019

(86) PCT No.: PCT/JP2019/036293
§ 371 (c)(1),
(2) Date: Jun. 3, 2021

(87) PCT Pub. No.: WO2020/121618
PCT Pub. Date: Jun. 18, 2020

(65) Prior Publication Data
US 2022/0019033 A1 Jan. 20, 2022

(30) Foreign Application Priority Data

Dec. 14, 2018 (JP) .............................. JP2018-234026
May 24, 2019 (JP) .............................. JP2019-097647

(51) Int. Cl.
*G02B 6/38* (2006.01)
*G02B 6/40* (2006.01)

(52) U.S. Cl.
CPC ......... *G02B 6/3882* (2013.01); *G02B 6/3853* (2013.01); *G02B 6/3885* (2013.01); *G02B 6/403* (2013.01)

(58) Field of Classification Search
CPC .. G02B 6/3853; G02B 6/3882; G02B 6/3885; G02B 6/403
See application file for complete search history.

(56) References Cited

U.S. PATENT DOCUMENTS

| 6,526,206 B2 * | 2/2003 | Kunkel | G02B 6/4231 |
| | | | 33/645 |
| 8,585,300 B2 * | 11/2013 | Buijs | G02B 6/3885 |
| | | | 385/78 |

(Continued)

FOREIGN PATENT DOCUMENTS

| JP | 2014-521996 A | 8/2014 |
| JP | 2016-009081 A | 1/2016 |

(Continued)

*Primary Examiner* — Ryan A Lepisto
(74) *Attorney, Agent, or Firm* — Osha Bergman Watanabe & Burton LLP

(57) ABSTRACT

A ferrule includes: a ferrule body including a first body-side guide hole into which a first guide pin is inserted, a second body-side guide hole into which a second guide pin is inserted, and an optical fiber holder that holds an optical fiber; and a lens plate including a first plate-side guide hole into which the first guide pin is inserted, a second plate-side guide hole into which the second guide pin is inserted, a lens part, and an abutment surface that an end face of the optical fiber abuts. The first guide pin fits the first body-side guide hole and the first plate-side guide hole. The second guide pin fits one of the second body-side guide hole or the second plate-side guide hole.

3 Claims, 6 Drawing Sheets

(56) References Cited

U.S. PATENT DOCUMENTS

| | | | | |
|---|---|---|---|---|
| 9,417,406 | B2* | 8/2016 | Isenhour | G02B 6/3893 |
| 9,645,318 | B2* | 5/2017 | Moriyama | G02B 6/3882 |
| 10,191,216 | B2* | 1/2019 | Evans | G02B 6/32 |
| 2011/0026882 | A1 | 2/2011 | Budd et al. | |
| 2012/0201494 | A1* | 8/2012 | Suzuki | G02B 6/3508 |
| | | | | 385/16 |

FOREIGN PATENT DOCUMENTS

| | | |
|---|---|---|
| JP | 2016-95410 A | 5/2016 |
| JP | 2018-092152 A | 6/2018 |
| JP | 2018-169581 A | 11/2018 |

* cited by examiner

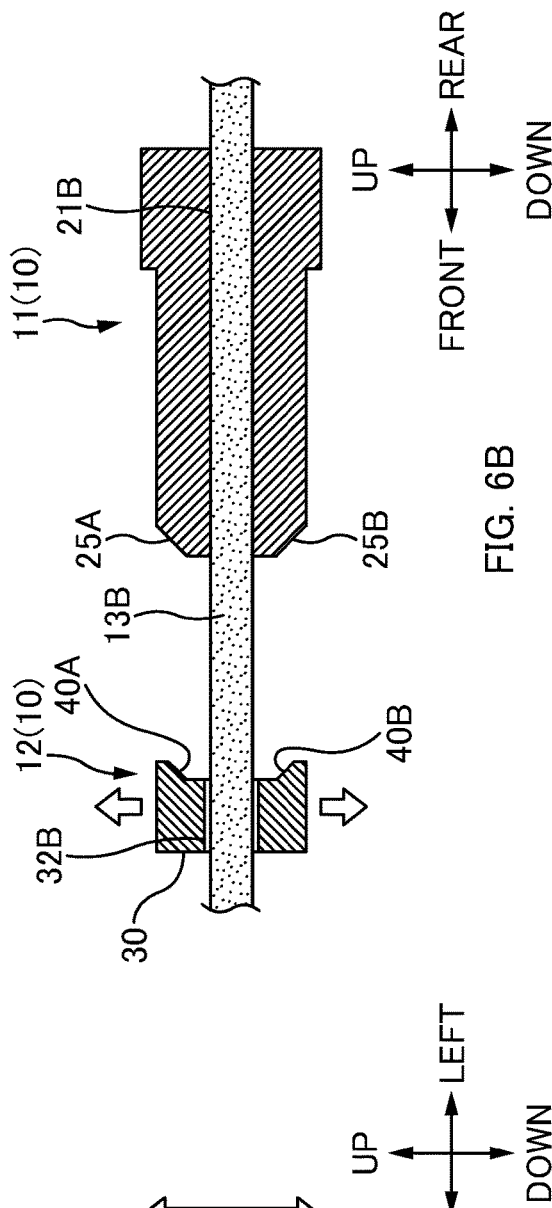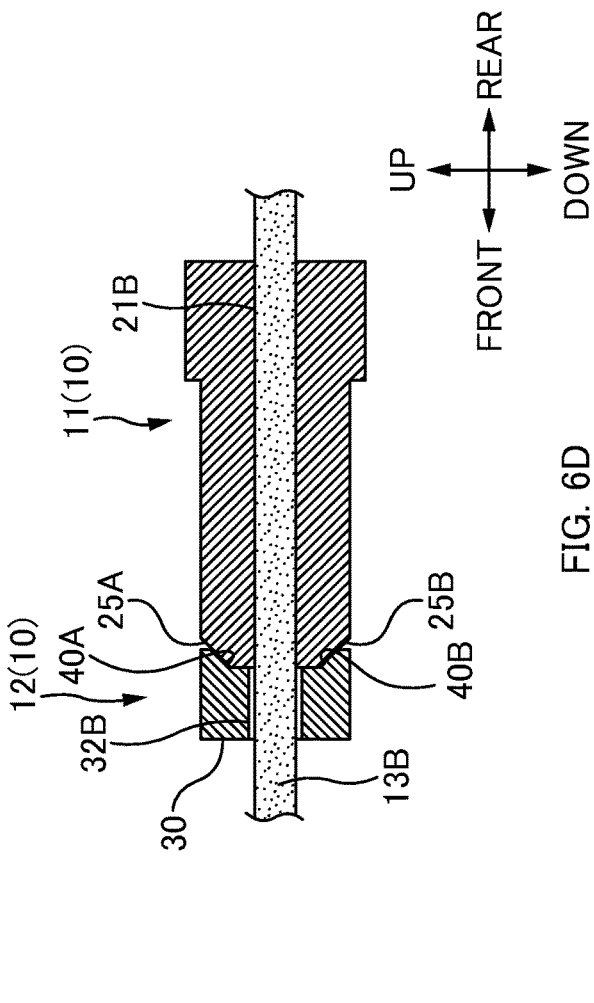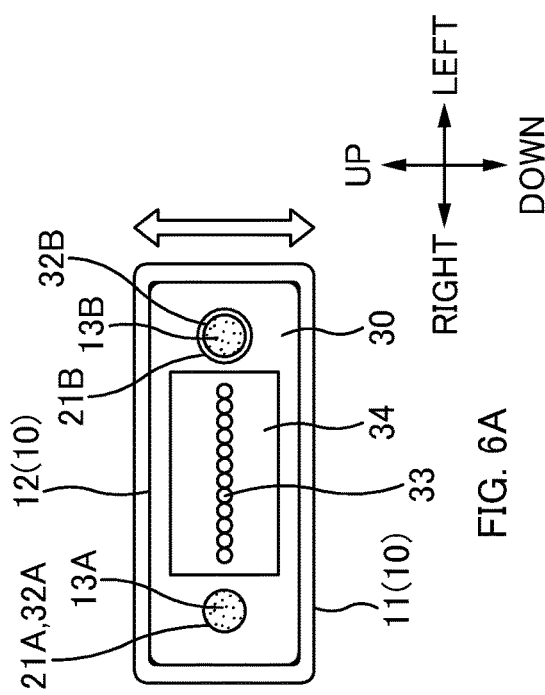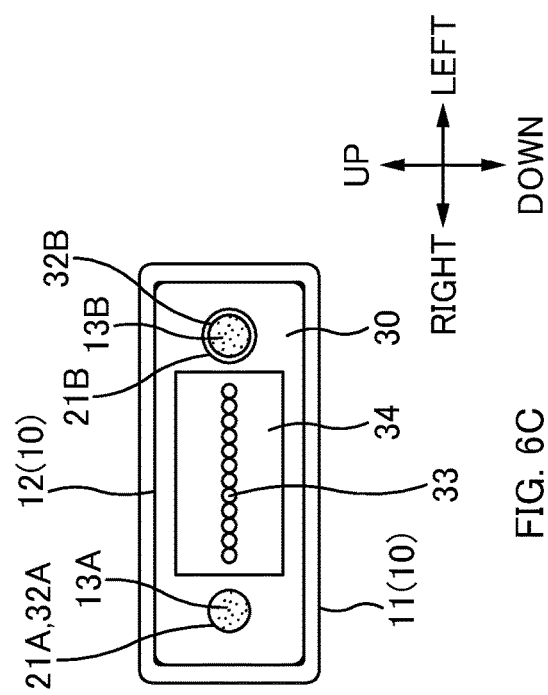

FERRULE, FIBER-EQUIPPED FERRULE, AND METHOD FOR MANUFACTURING FIBER-EQUIPPED FERRULE

TECHNICAL FIELD

The present invention relates to a ferrule, a fiber-equipped ferrule, and a method for manufacturing a fiber-equipped ferrule.

BACKGROUND

There has been known a technique relating to a so-called lens connector in which ferrules each having a lens at an endface face each other, and thus optical fibers held by the respective ferrules are optically connected to each other. As such a lens connector, there has been known a connector configured with a ferrule body that holds an end part of an optical fiber and a lens plate provided with a lens separately. For example, Patent Literature 1 discloses a ferrule structure in which a fiber hole of a ferrule body and a lens part of a lens plate are positioned via two guide pins with high precision.

PATENT LITERATURE

Patent Literature 1: JP 2018-92152 A

As described in Patent Literature 1, in the ferrule body, a positional relationship between two parts being the fiber hole and a guide pin hole is established with high precision. In the lens plate, a positional relationship between two parts being the lens part and a guide pin hole is established with high precision. However, in a case where pitches do not match between the guide pin holes of the ferrule body and the guide pin holes of the lens plate, inserting the guide pin causes deformation of the ferrule body or the lens plate, and this may cause misalignment between the fiber hole of the ferrule body and the lens part of the lens plate in some cases.

SUMMARY

One or more embodiments of the invention prevent misalignment of a fiber hole of a ferrule body and a lens part of a lens plate even when pitches do not match between guide pin holes of the ferrule body and lens parts of the lens plate.

Some embodiments of the present invention is a ferrule comprising: a ferrule body including a first body-side guide hole configured to be inserted a first guide pin, a second body-side guide hole configured to be inserted a second guide pin, and an optical fiber holding part configured to hold an optical fiber; and a lens plate including a first plate-side guide hole configured to be inserted the first guide pin, a second plate-side guide hole configured to be inserted the second guide pin, a lens part, and an abutment surface configured to be abutted an end face of the optical fiber, wherein the first body-side guide hole and the first plate-side guide hole are formed to be fitted by the first guide pin, one of the second body-side guide hole and the second plate-side guide hole is formed to be fitted by the second guide pin, and the other one of the second body-side guide hole and the second plate-side guide hole is formed to have a diameter greater than a diameter of a hole fitted by the second guide pin, the ferrule body includes a body-side positioning part, the lens plate includes a plate-side positioning part, and the body-side positioning part and the plate-side positioning part come into contact with each other so that the lens plate is positioned with respect to the ferrule body in a direction perpendicular to a plane including a central axis of the first plate-side guide hole and a central axis of the second plate-side guide hole.

Other features of the invention are made clear by the following description and the drawings.

With some embodiments of the present invention, it is possible to prevent misalignment of a fiber hole of a ferrule body and a lens part of a lens plate even when pitches do not match between guide pin holes of the ferrule body and lens parts of the lens plate.

BRIEF DESCRIPTION OF THE DRAWINGS

FIG. 6A to FIG. 6D are explanatory views illustrating a state in which fiber holes 22 of a ferrule body 11 and lens parts 33 of a lens plate 12 of one or more embodiments are positioned with each other.

DETAILED DESCRIPTION

Figure 1A:
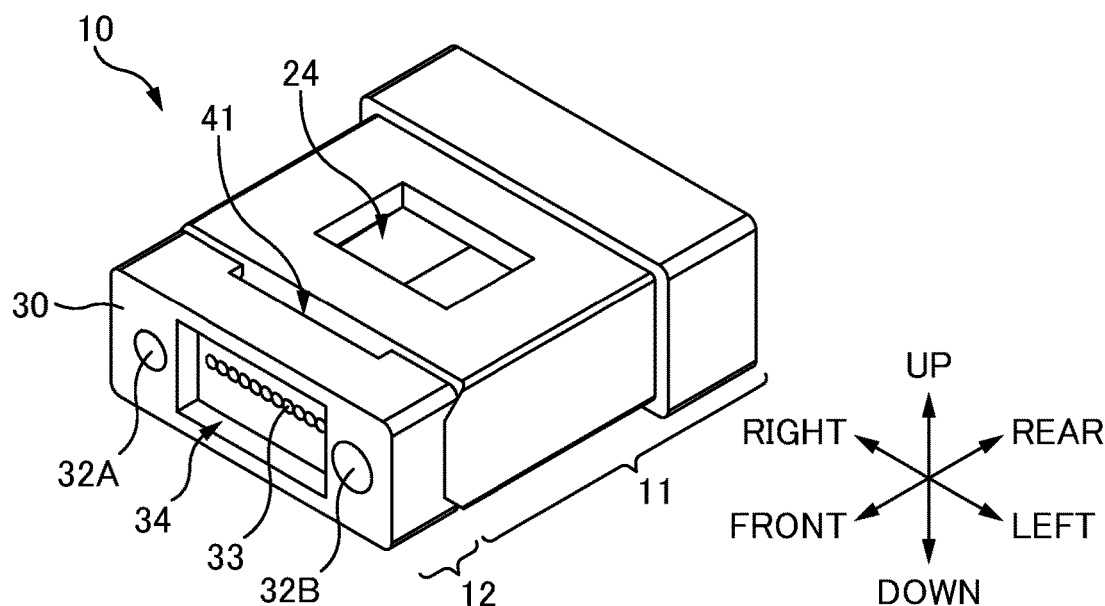
FIG. 1A is a general perspective view of a ferrule structure 10 of one or more embodiments.

At least the following matters are clarified from the following description and the drawings.

It will be clarified that a ferrule comprising: a ferrule body including a first body-side guide hole configured to be inserted a first guide pin, a second body-side guide hole configured to be inserted a second guide pin, and an optical fiber holding part configured to hold an optical fiber; and a lens plate including a first plate-side guide hole configured to be inserted the first guide pin, a second plate-side guide hole configured to be inserted the second guide pin, a lens part, and an abutment surface configured to be abutted an end face of the optical fiber, wherein the first body-side guide hole and the first plate-side guide hole are formed to be fitted by the first guide pin, one of the second body-side guide hole and the second plate-side guide hole is formed to be fitted by the second guide pin, and the other one of the second body-side guide hole and the second plate-side guide hole is formed to have a diameter greater than a diameter of a hole fitted by the second guide pin, the ferrule body includes a body-side positioning part, the lens plate includes a plate-side positioning part, and the body-side positioning part and the plate-side positioning part come into contact with each other so that the lens plate is positioned with respect to the ferrule body in a direction perpendicular to a plane including a central axis of the first plate-side guide hole and a central axis of the second plate-side guide hole. With this ferrule, it is possible to prevent misalignment of a fiber hole of a ferrule body and a lens part of a lens plate even when pitches do not match between guide pin holes of the ferrule body and lens parts of the lens plate.

The second body-side guide hole may be formed to be fitted by the second guide pin, and the second plate-side guide hole may be formed to have a diameter greater than a diameter of the second body-side guide hole. In this way, it is possible to prevent misalignment of a fiber hole of a ferrule body and a lens part of a lens plate even when pitches do not match between guide pin holes of the ferrule body and lens parts of the lens plate.

It will be clarified that a ferrule equipped with a fiber comprising: an optical fiber; a ferrule body including a first body-side guide hole configured to be inserted a first guide pin, a second body-side guide hole configured to be inserted a second guide pin, and an optical fiber holding part configured to hold an optical fiber; and a lens plate including a first plate-side guide hole configured to be inserted the first guide pin, a second plate-side guide hole configured to be inserted the second guide pin, a lens part, and an abutment surface configured to be abutted an end face of the optical fiber, wherein the first body-side guide hole and the first plate-side guide hole are formed to be fitted by the first guide pin, one of the second body-side guide hole and the second plate-side guide hole is formed to be fitted by the second guide pin, and the other one of the second body-side guide hole and the second plate-side guide hole is formed to have a diameter greater than a diameter of a hole fitted by the second guide pin, the ferrule body includes a body-side positioning part, the lens plate includes a plate-side positioning part, and the body-side positioning part and the plate-side positioning part come into contact with each other so that the lens plate is positioned with respect to the ferrule body in a direction perpendicular to a plane including a central axis of the first plate-side guide hole and a central axis of the second plate-side guide hole. With this ferrule equipped with a fiber, it is possible to prevent misalignment of a fiber hole of a ferrule body and a lens part of a lens plate even when pitches do not match between guide pin holes of the ferrule body and lens parts of the lens plate.

It will be clarified that a method for manufacturing a ferrule equipped with a fiber, wherein the ferrule equipped with a fiber includes an optical fiber, a ferrule body including a first body-side guide hole configured to be inserted a first guide pin, a second body-side guide hole configured to be inserted a second guide pin, and an optical fiber holding part configured to hold an optical fiber; and a lens plate including a first plate-side guide hole configured to be inserted the first guide pin, a second plate-side guide hole configured to be inserted the second guide pin, a lens part, and an abutment surface configured to be abutted an end face of the optical fiber, wherein the first body-side guide hole and the first plate-side guide hole are formed to be fitted by the first guide pin, one of the second body-side guide hole and the second plate-side guide hole is formed to be fitted by the second guide pin, and the other one of the second body-side guide hole and the second plate-side guide hole is formed to have a diameter greater than a diameter of a hole fitted by the second guide pin, the ferrule body includes a body-side positioning part, the lens plate includes a plate-side positioning part, the method comprising: inserting the first guide pin and the second guide pin into the first body-side guide hole and the second body-side guide hole, respectively; inserting the first guide pin and the second guide pin into the first plate-side guide hole and the second plate-side guide hole, respectively; and positioning the lens plate with respect to the ferrule body in a direction perpendicular to a plane including a central axis of the first plate-side guide hole and a central axis of the second plate-side guide hole by making the body-side positioning part and the plate-side positioning part come into contact with each other. With this method for manufacturing a ferrule with a fiber, it is possible to prevent misalignment of a fiber hole of a ferrule body and a lens part of a lens plate even when pitches do not match between guide pin holes of the ferrule body and lens parts of the lens plate.

Outline of Ferrule Structure 10

Figure 1B:
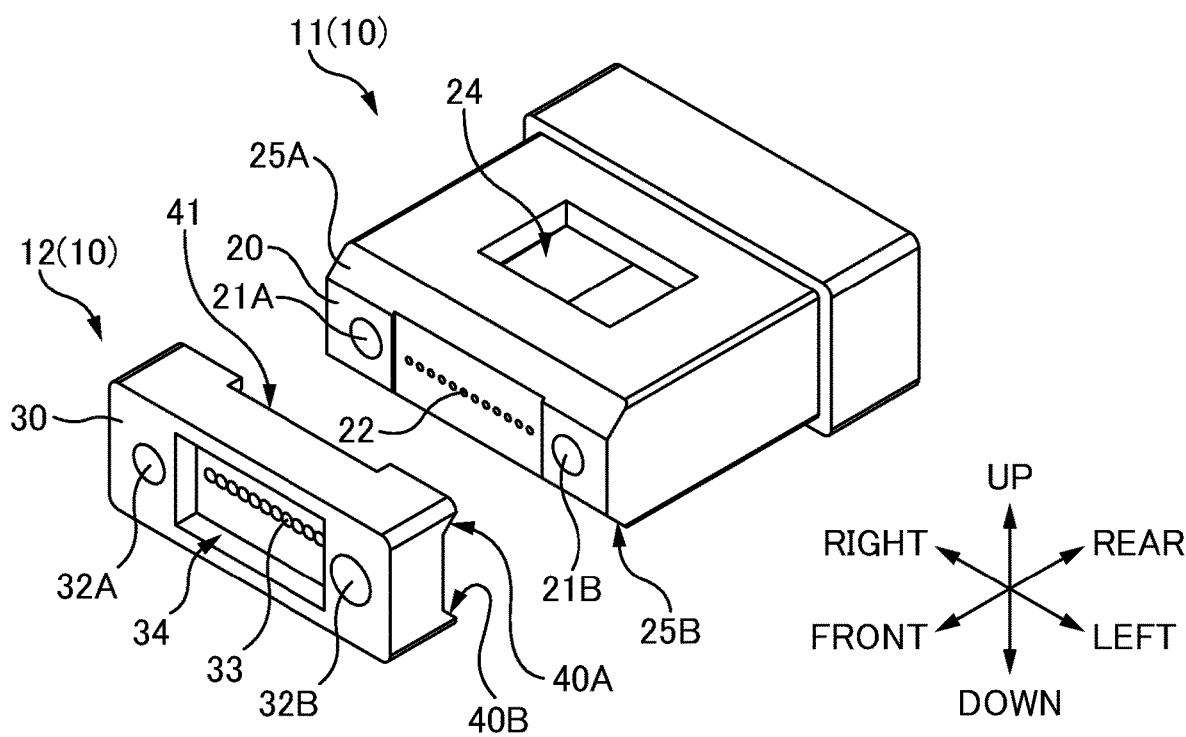
FIG. 1B is an exploded perspective view of the ferrule structure 10 of one or more embodiments.
Figure 2A:
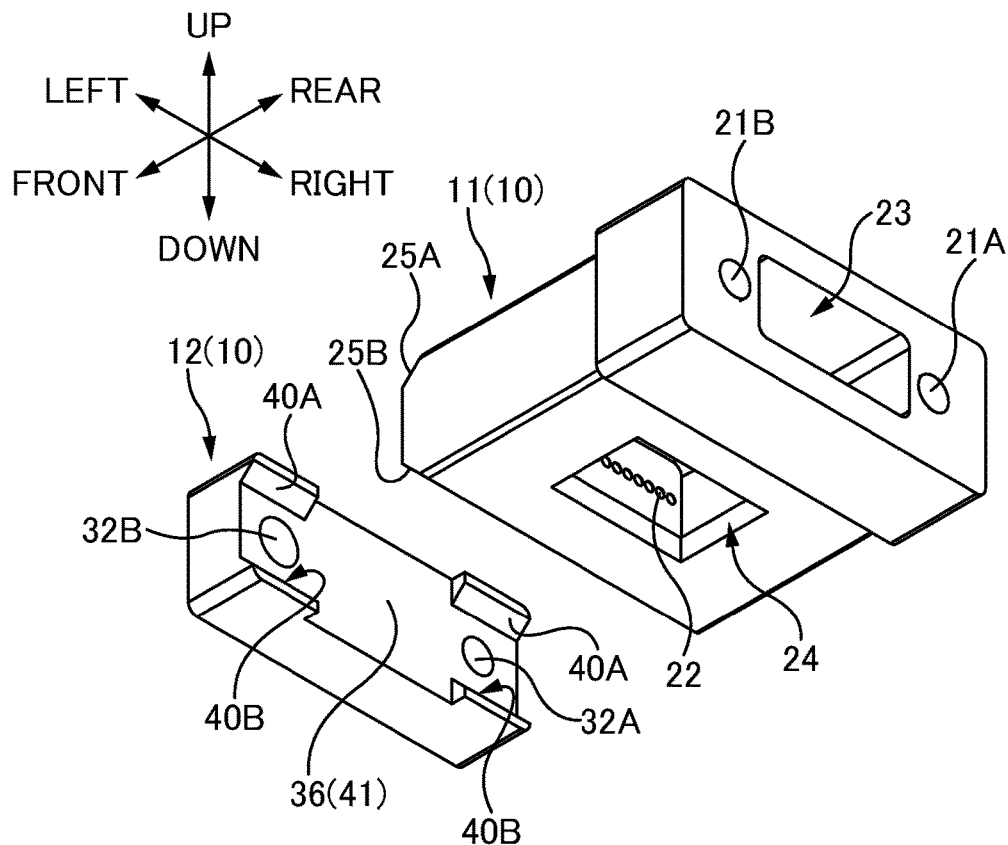
FIG. 2A is an exploded perspective view of the ferrule structure 10 of one or more embodiments when seen from below.
Figure 2B:
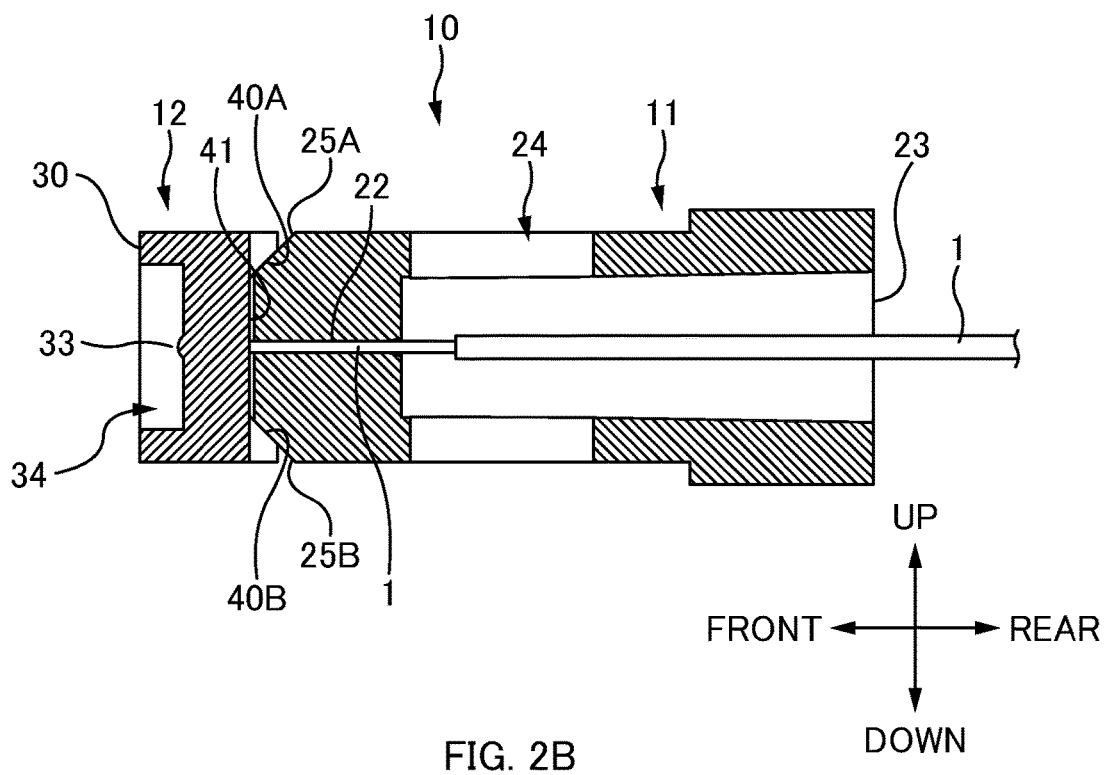
FIG. 2B is a cross-sectional view of the ferrule structure 10 with a fiber of one or more embodiments.

FIG. 1A is a general perspective view of a ferrule structure 10 of one or more embodiments. FIG. 1B is an exploded perspective view of the ferrule structure 10 of one or more embodiments. FIG. 2A is an exploded perspective view of the ferrule structure 10 of one or more embodiments when seen from below. FIG. 2B is a cross-sectional view of the ferrule structure 10 equipped with a fiber of one or more embodiments. Note that FIG. 2B illustrates a cross section taken along a plane perpendicular to a left-right direction at a position of a central axis of an optical fiber 1.

In the following description, directions will be defined as illustrated in the drawings. Specifically, a direction along a fiber hole 22 is a "front-rear direction". A side of an end face of the optical fiber 1, which is inserted into the fiber hole 22, or a side close to a lens plate 12 when seen from a ferrule body 11 is "front", and the opposite side is "rear". Further, a direction in which two body-side guide holes 21 (a body-side guide hole 21A and a body-side guide hole 21B) are positioned, or two plate-side guide holes 32 (a plate-side guide hole 32A and a plate-side guide hole 32B) are positioned is a "left-right direction". A right side when the front side is seen from the rear side is "right", and the opposite side is "left". Further, a direction perpendicular to the front-rear direction and the left-right direction is an "up-down direction".

The ferrule structure 10 is a member for holding an end part of the optical fiber 1 and optically connecting the optical fiber 1 to another optical component. The ferrule structure 10 may be simply referred to as a "ferrule". The ferrule structure 10 includes the ferrule body 11 and the lens plate 12.

The ferrule body 11 is a member that holds the end part of the optical fiber 1. The ferrule body 11 includes the two body-side guide holes 21 (the body-side guide hole 21A and the body-side guide hole 21B), the fiber holes 22, a fiber insertion opening 23, an adhesive filling part 24, and a body-side positioning part 25 (i.e., body-side positioner).

Note that the ferrule body 11 has a configuration substantially similar to that of a mechanically transferable (MT) optical connector (F12 optical connector established by JIS C5981), for example. However, while an end surface of a ferrule and an end face of the optical fiber are polished in a normal MT optical connector, an end surface of a ferrule and the end face of the optical fiber are not polished in one or more embodiments because an end face 3 of the optical fiber 1 protrudes from a front end surface 20 of the ferrule body 11 (opening surface of the fiber hole 22), as described later. While the end face of the fiber is exposed from the ferrule end surface in the normal MT optical connector, in one or more embodiments the end face of the optical fiber 1 is not exposed to the outside because the lens plate 12 is arranged on the front side of the ferrule body 11 and the end face 3 of the optical fiber 1 abuts on the lens plate 12.

The two body-side guide holes 21 (the body-side guide hole 21A and the body-side guide hole 21B) are holes for inserting guide pins 13 (not illustrated in FIG. 1A to FIG. 2B; refer to FIG. 4A and FIG. 4B described later). As described later, the body-side guide holes 21 are also used for positioning the fiber holes 22 of the ferrule body 11 and the lens parts 33 of the lens plate 12. The body-side guide holes 21 penetrate the ferrule body 11 along the front-rear direction. Two body-side guide holes 21 are opened in the front end surface 20 of the ferrule body 11. The two body-side guide holes 21 are arranged at an interval in the left-right direction so as to sandwich a plurality of the fiber holes 22 in the left-right direction. The two body-side guide holes 21 are described later in detail.

The fiber holes 22 are holes for inserting the optical fibers 1. The fiber holes 22 are also holes for positioning the optical fibers 1. Thus, the fiber holes 22 are formed with respect to the body-side guide holes 21 with high precision. The fiber holes 22 penetrate between the front end surface 20 and the adhesive filling part 24. The fiber holes 22 are opened in the front end surface 20 of the ferrule body 11. A bare optical fiber in which a sheath is removed from an optical fiber core wire is inserted into each fiber hole 22. The fiber holes 22 are formed along the front-rear direction.

The plurality of fiber holes 22 are formed in the ferrule body 11 of one or more embodiments. Further, in one or more embodiments, the plurality of fiber holes 22 are positioned in the left-right direction. The optical fibers 1 constituting an optical fiber ribbon are inserted into the fiber holes 22 positioned in the left-right direction. However, the number of the fiber holes 22 does not have to be plural. For example, only one fiber hole 22 may be formed. In this case, the optical fiber 1 inserted into the fiber hole 22 does not constitute an optical fiber ribbon.

The fiber insertion opening 23 is an opening formed in a rear end surface of the ferrule body 11. The optical fibers 1 are inserted into the ferrule body 11 through the fiber insertion opening 23. A boot (not illustrated) may be inserted into the ferrule body 11, and hence the fiber insertion opening 23 may be referred to as a "boot hole".

The adhesive filling part 24 is a hollow part to be filled with an adhesive. An adhesive for keeping the optical fibers 1 in the ferrule body 11 fills the adhesive filling part 24. The adhesive is filled to the adhesive filling part 24, and thus the adhesive is applied between inner wall surfaces of the adhesive filling part 24 and the fiber holes 22, and the optical fiber 1. This adhesive is cured to fix the optical fiber 1 to the ferrule body 11. With this, the end part of the optical fiber 1 is held by the ferrule body 11. The fiber hole 22 and the adhesive filling part 24 may be collectively referred to as an optical fiber holding part (i.e., optical fiber holder).

The body-side positioning part 25 is a part for positioning the fiber holes 22 of the ferrule body 11 and the lens parts 33 of the lens plate 12 with each other in the up-down direction. The body-side positioning part 25 includes a body-side positioning part 25A formed on the upper side of the front end surface 20 and a body-side positioning part 25B formed on the lower side of the front end surface 20. The body-side positioning part 25 (the body-side positioning part 25A and the body-side positioning part 25B) are described later in detail.

The lens plate 12 is an optical component provided with a plurality of lenses. The lens plate 12 is molded from transparent resin that allows transmission of an optical signal. The lens plate 12 is arranged on the front side of the ferrule body 11 while a plate-side positioning part 40 (i.e., plate-side positioner) described later contacts with the body-side positioning part 25 of the ferrule body 11. The lens plate 12 includes the two plate-side guide holes 32 (the plate-side guide hole 32A and the plate-side guide hole 32B), the lens parts 33, an abutment surface 36, and the plate-side positioning part 40.

The two plate-side guide holes 32 (the plate-side guide hole 32A and the plate-side guide hole 32B) are holes for inserting the guide pins 13 (not illustrated in FIG. 1A to FIG. 2B, refer to FIG. 4A and FIG. 4B described later). The plate-side guide holes 32 are used for positioning the fiber holes 22 of the ferrule body 11 and the lens parts 33 of the lens plate 12 with each other. Thus, a pitch (an interval) between the two plate-side guide holes 32 is the same as a pitch (an interval) between the two body-side guide holes 21 of the ferrule body 10. Note that, the following description is given under the definition that the pitch (the interval) between the two guide holes (the two body-side guide holes 21 or the two plate-side guide holes 32) corresponds to a distance between central axes of the two guide holes. Specifically, the distance between the central axes of the two plate-side guide holes 32 is the same as the distance between the central axes of the two body-side guide holes 21 of the ferrule body 10. The plate-side guide holes 32 penetrate the lens plate 12 along the front-rear direction. Each of the two plate-side guide holes 32 is opened in a front end surface 30 and a bottom part 41 (described later) of the lens plate 12. The two plate-side guide holes 32 are described later in detail.

The lens parts 33 are arranged so as to correspond to the end faces of the plurality of optical fibers 1 to be inserted into the plurality of fiber holes 22. An optical signal enters or is emitted from each of the end faces of the optical fibers 1 via each lens part 33. As described above, in one or more embodiments, the row of the fiber holes 22 arrayed in the left-right direction is arranged. Further, with regard to the lens parts 33, the row of the lens parts 33 arrayed in the left-right direction is arranged. Specifically, the row of the lens parts 33 arrayed in the left-right direction is arranged on the lens plate 12, and hence the lens parts 33 are arranged so as to correspond to the end faces of the optical fibers 1 inserted into the fiber holes 22 in the row. Thus, the lens parts 33 are formed with respect to the plate-side guide holes 32 with high precision. The lens part 33 is formed so as to function as, for example, a collimating lens. An optical signal increased in diameter by the lens part 33 enters or is emitted, and hence the optical signal is propagated as collimated light. Thus, even when dust enters a space between connectors, stable connection can be established, and a transmission loss of the optical signal can be suppressed. An optical signal increased in diameter by the lens part 33 enters or is emitted, and hence the optical signal is transmitted as collimated light. Thus, even when an optical path of the optical signal is deviated between connectors, a transmission loss of the optical signal can be suppressed. The lens parts 33 are formed on the front end surface 30 side of the lens plate 12, and are formed in the front end surface of the ferrule structure 10. The lens parts 33 are formed on a bottom part of a recess (a lens arrangement part 34) formed in the lens plate 12 so that the convex lens parts 33 do not contact each other when the ferrule structures 10 face and abut each other. However, when one fiber hole 22 is formed in the ferrule body 11, one lens part 33 is arranged correspondingly.

The abutment surface 36 is an abutment surface to which the end face of the optical fiber 1 abuts. The abutment surface 36 is formed on the bottom part 41 which is the recess located on the rear side of the lens plate 12. Thus, when the lens plate 12 is attached to the ferrule body 11 via the guide pins 13 (described later), the abutment surface 36 faces the openings of the fiber holes 22 of the ferrule body 11. Note that the width of the bottom part 41 in the left-right direction is longer than the width of the row of the fiber holes 22 arrayed in the left-right direction (longer than the width of the optical fiber ribbon). The bottom part 41 is formed, and hence a gap is formed between the opening surface of the fiber hole 22 of the ferrule body 11 and the abutment surface 36 of the lens plate 12. Specifically, the bottom part 41 is formed on the lens plate 12, and hence a gap is formed between the lens plate 12 and the ferrule body 11. This gap functions as a matching material filling part to be filled with an adhesive having a function as a refractive index matching material. However, the gap between the lens plate 12 and the ferrule body 11 does not have to be filled with a refractive index matching material. In one or more embodiments, the bottom part 41 is formed from the upper surface to the lower surface of the lens plate 12. Thus, the bottom part 41 (the matching material filling part) is opened in the upper surface and the lower surface of the ferrule structure 10.

Together with the body-side positioning part 25 described above, the plate-side positioning part 40 is a part for positioning the fiber holes 22 of the ferrule body 11 and the lens parts 33 of the lens plate 12 with each other in the up-down direction. The plate-side positioning part 40 includes the plate-side positioning part 40A formed on the upper side of the abutment surface 36 and the plate-side positioning part 40B formed on the lower side of the abutment surface 36. However, as illustrated in FIG. 2A, the plate-side positioning part 40A and the plate-side positioning part 40B are not formed on the part located with the bottom part 41. The plate-side positioning part 40 is described later in detail.

Comparative Example

Figure 3A:
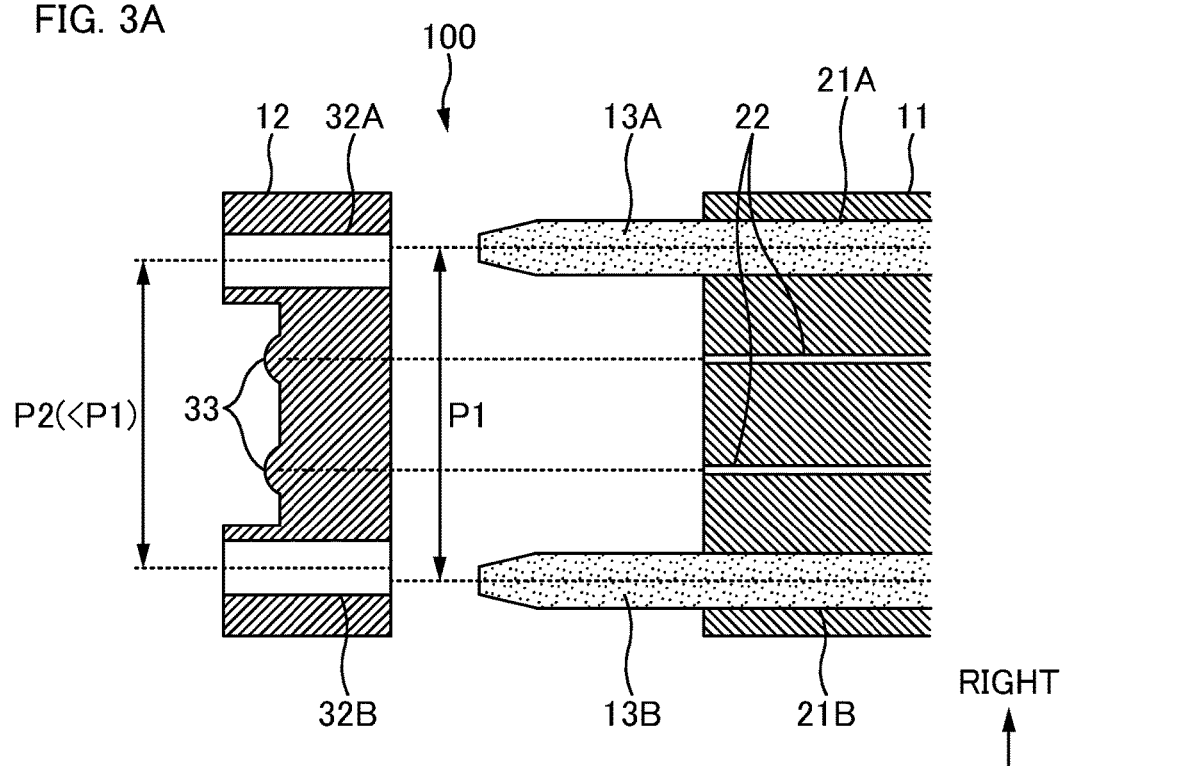
FIG. 3A and FIG. 3B are explanatory views illustrating a state in which a ferrule body 11 and a lens plate 12 of a ferrule structure 100 of a comparative example are assembled via guide pins 13.
Figure 3B:
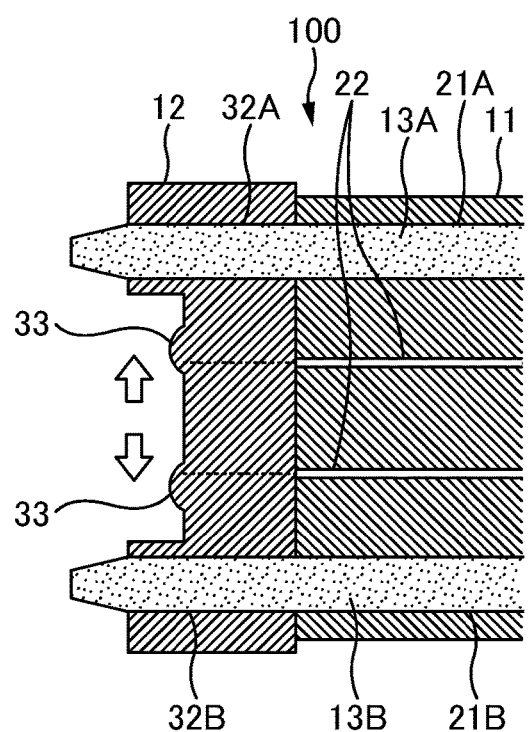

FIG. 3A and FIG. 3B are explanatory views illustrating a state in which the ferrule body 11 and the lens plate 12 of a ferrule structure 100 of a Comparative Example are assembled via the guide pins 13. Note that FIG. 3A and FIG. 3B illustrate a cross section taken along a plane perpendicular to the up-down direction at the positions of the central axes of the guide pins 13.

Similarly to the ferrule structure 10 of the embodiments described above, the fiber holes 22 are formed with respect to the body-side guide holes 21 in high precision in the ferrule structure 100 of the Comparative Example. The lens parts 33 are also formed with respect to the plate-side guide holes 32 with high precision. However, in the ferrule structure 100 of Comparative Example, a relationship between the body-side guide holes 21 and the plate-side guide holes 32 is not designed with high precision. Thus, in the Comparative Example, when the ferrule structure 10 is manufactured, the two plate-side guide holes 32 are formed to have a pitch different from a pitch between the two body-side guide holes 21 in some cases. For example, as illustrated in FIG. 3A, the pitch between the two body-side guide holes 21 (the body-side guide hole 21A and the body-side guide hole 21B) is formed to be P1. In contrast, the pitch between the two plate-side guide holes 32 (the plate-side guide hole 32A and the plate-side guide hole 32B) is formed to be P2 that is smaller than P1 (P2<P1) in some cases. Here, as illustrated in FIG. 3A, the two guide pins 13 (the guide pin 13A and the guide pin 13B) are fitted into the two body-side guide holes 21 (the body-side guide hole 21A and the body-side guide hole 21B), respectively. Thus, the two guide pins 13 (the guide pin 13A and the guide pin 13B) are not fitted into the two plate-side guide holes 32 (the plate-side guide hole 32A and the plate-side guide hole 32B). When the two guide pins 13 in this state are inserted into the two plate-side guide holes 32, the guide pins 13 pressurize the inner surfaces of the plate-side guide holes 32. With this, the lens plate 12 is deformed. Consequently, as illustrated in FIG. 3B, the lens parts 33 are shifted from the original positions. With this, misalignment is caused in the relationship between the fiber holes 22 and the lens parts 33, and this may also cause degradation of connection efficiency due to axis deviation when the optical connectors are connected to each other. Note that, the situation is similarly caused in a case where the pitch between the two plate-side guide holes 32 is formed to be greater than the pitch between the two body-side guide holes 21 (P2>P1).

Figure 4A:
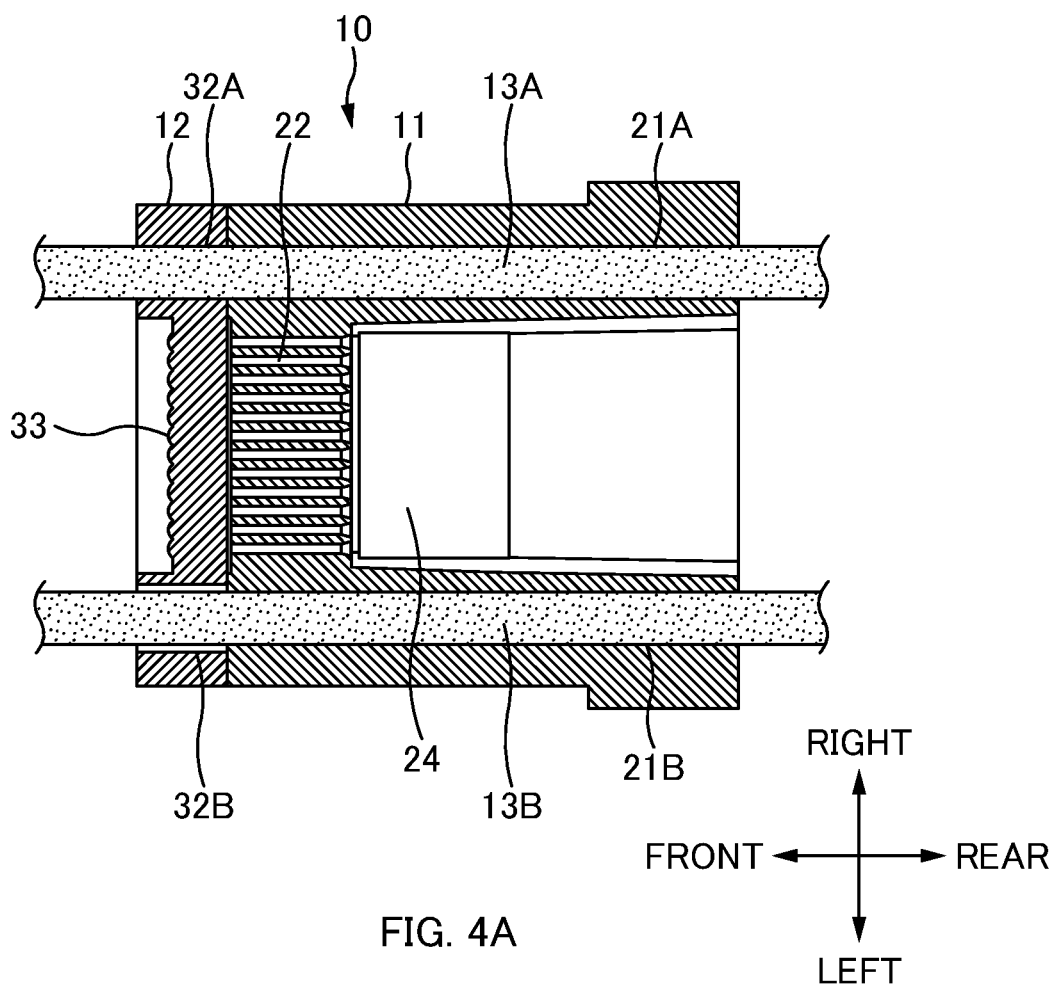
FIG. 4A and FIG. 4B are cross-sectional explanatory views illustrating a state in which guide pins 13 are inserted into body-side guide holes 21 and plate-side guide holes 32 of one or more embodiments.
Figure 4B:
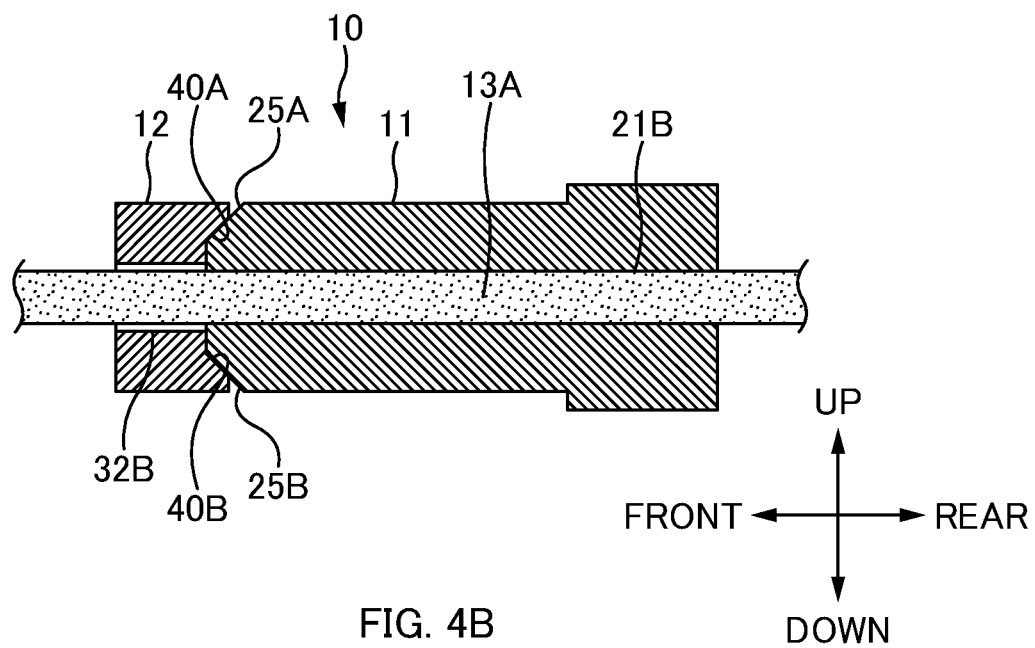

Positioning Between Ferrule Body 11 and Lens Plate 12 of One or More Embodiments FIG. 4A and FIG. 4B are cross-sectional explanatory views illustrating a state in which the guide pins 13 are inserted into the body-side guide holes 21 and the plate-side guide holes 32 of one or more embodiments. Note that FIG. 4A is a cross-sectional explanatory view of the ferrule structure 10 of one or more embodiments taken along a plane perpendicular to the up-down direction. FIG. 4B is a cross-sectional explanatory view of the ferrule structure 10 of one or more embodiments taken along a plane perpendicular to the left-right direction.

In the Comparative Example described above, the fiber holes 22 are formed with respect to the body-side guide holes 21 with high precision, and the lens parts 33 are formed with respect to the plate-side guide holes 32 with high precision. However, the relationship between the body-side guide holes 21 and the plate-side guide holes 32 is not designed with high precision. Thus, Comparative Example is an example where the two body-side guide holes 21 and the two plate-side guide holes 32 are formed to have different pitches when manufacturing the ferrule structure 10. Thus, in the Comparative Example, the pitches do not match between the two body-side guide holes 21 and the two plate-side guide holes 32, and hence the lens plate 12 is deformed when the two guide pins 13 are inserted. With this, misalignment is caused in the relationship between the fiber holes 22 of the ferrule body 11 and the lens parts 33 of the lens plate 12.

In view of this, in one or more embodiments, the diameter of the body-side guide hole 21 (the body-side guide hole 21A) and the diameter of the plate-side guide hole 32 (the plate-side guide hole 32A) for inserting one guide pin 13 (the guide pin 13A) of the two guide pins 13 are formed so that the guide pin 13 is fitted thereinto. The diameter of the plate-side guide hole 32 (the plate-side guide hole 32B) for inserting the other guide pin 13 (the guide pin 13B) is formed to be greater than a diameter for fitting of the guide pin 13. Specifically, the plate-side guide hole 32B is formed to be larger than the plate-side guide hole 32A. With this, even when the pitch for the plate-side guide hole 32 (the plate-side guide hole 32B) for inserting the other guide pin 13 (the guide pin 13B) does not match with the pitch for the body-side guide hole 21 (the body-side guide hole 21B), misalignment between the fiber holes 22 of the ferrule body 11 and the positions of the lens parts 33 of the lens plate 12 can be suppressed.

As illustrated in FIG. 4A and FIG. 4B, in one or more embodiments, the body-side guide hole 21A and the plate-side guide hole 32A are formed so that the guide pin 13A is fitted thereinto. The body-side guide hole 21B is also formed so that the guide pin 13B is fitted thereinto. However, the plate-side guide hole 32B is formed to have a diameter greater than the diameter for fitting of the guide pin 13B.

Thus, even when, at the time of manufacturing the ferrule structure 10, the plate-side guide hole 32B is formed to have a pitch different from one during manufacture, the position of the plate-side guide hole 32B can be prevented from being shifted with respect to the width of the guide pin 13B fitted into the body-side guide hole 21B. With this, deformation of the lens plate 12, which is caused by inserting the guide pin 13B into the plate-side guide hole 32B and pressurizing the inner surface of the plate-side guide hole 32B, can be suppressed.

In one or more embodiments, the body-side guide hole 21A and the plate-side guide hole 32A are formed so that the guide pin 13A is fitted thereinto. The body-side guide hole 21B is formed so that the guide pin 13B is fitted thereinto, and the plate-side guide hole 32B is formed to have a diameter greater than the diameter for fitting of the guide pin 13B. Thus, when the two guide pins 13 (the guide pin 13A and the guide pin 13B) inserted into the ferrule body 11 are merely inserted into the two plate-side guide holes 32 (the plate-side guide hole 32A and the plate-side guide hole 32B) of the lens plate 12, respectively, the lens plate 12 is rotatable with respect to the ferrule body 11 about the central axis of the plate-side guide hole 32A (the body-side guide hole 21A) for inserting the guide pin 13A. Specifically, when the two guide pins 13 (the guide pin 13A and the guide pin 13B) inserted into the ferrule body 11 are merely inserted into the plate-side guide holes 32 (the plate-side guide hole 32A and the plate-side guide hole 32B) of the lens plate 12, the lens parts 33 of the lens plate 12 are not positioned with the fiber holes 22 of the ferrule body 11 in the rotation direction about the central axis of the plate-side guide hole 32A (the body-side guide hole 21A).

In view of this, as illustrated in FIG. 4B, in one or more embodiments, the body-side positioning part 25 is provided. The body-side positioning part 25 is a part that comes into contact with the plate-side positioning part 40 described later. The body-side positioning part 25 is located on the front side of the ferrule body 11. The body-side positioning part 25 includes the body-side positioning part 25A being an inclined surface (tapered surface) that is inclined frontward toward the lower side, and the body-side positioning part 25B being an inclined surface (tapered surface) that is inclined frontward toward the upper side. When the body-side positioning part 25 is brought into contact with the plate-side positioning part 40, the lens plate 12 can be positioned with the ferrule body 11 in the front-rear direction and the up-down direction. With this, the lens parts 33 of the lens plate 12 are also positioned with the fiber holes 22 of the ferrule body 11 in the rotation direction about the central axis of the plate-side guide hole 32A (the body-side guide hole 21A).

Meanwhile, in one or more embodiments, the plate-side positioning part 40 is provided. The plate-side positioning part 40 is a part contacting with the body-side positioning part 25 described above. The plate-side positioning part 40 is located on the rear side of the lens plate 12. The plate-side positioning part 40 includes the plate-side positioning part 40A being an inclined surface (tapered surface) that is inclined rearward the nearer to the upper side, and the plate-side positioning part 40B being an inclined surface (tapered surface) that is inclined rearward the nearer to the lower side. When the plate-side positioning part 40 is brought into contact with the body-side positioning part 25, the lens plate 12 can be positioned with the ferrule body 11 in the front-rear direction and the up-down direction. With this, the lens parts 33 of the lens plate 12 are also positioned with the fiber holes 22 of the ferrule body 11 in the rotation direction about the central axis of the plate-side guide hole 32A (the body-side guide hole 21A).

Note that, as illustrated in FIG. 4B, in one or more embodiments, the plate-side positioning part 40 (the plate-side positioning part 40A and the plate-side positioning part 40B) is located so as to sandwich the plate-side guide hole 32B in the up-down direction. Thus, the plate-side positioning part 40 (the plate-side positioning part 40A and the plate-side positioning part 40B) enables positioning of the plate-side guide hole 32B from both the sides in the up-down direction, and the position of the plate-side guide hole 32B can be positioned highly precisely with the guide pin 13B in the up-down direction.

Method for Manufacturing Ferrule Structure 10 Equipped with Fiber

Figure 5:
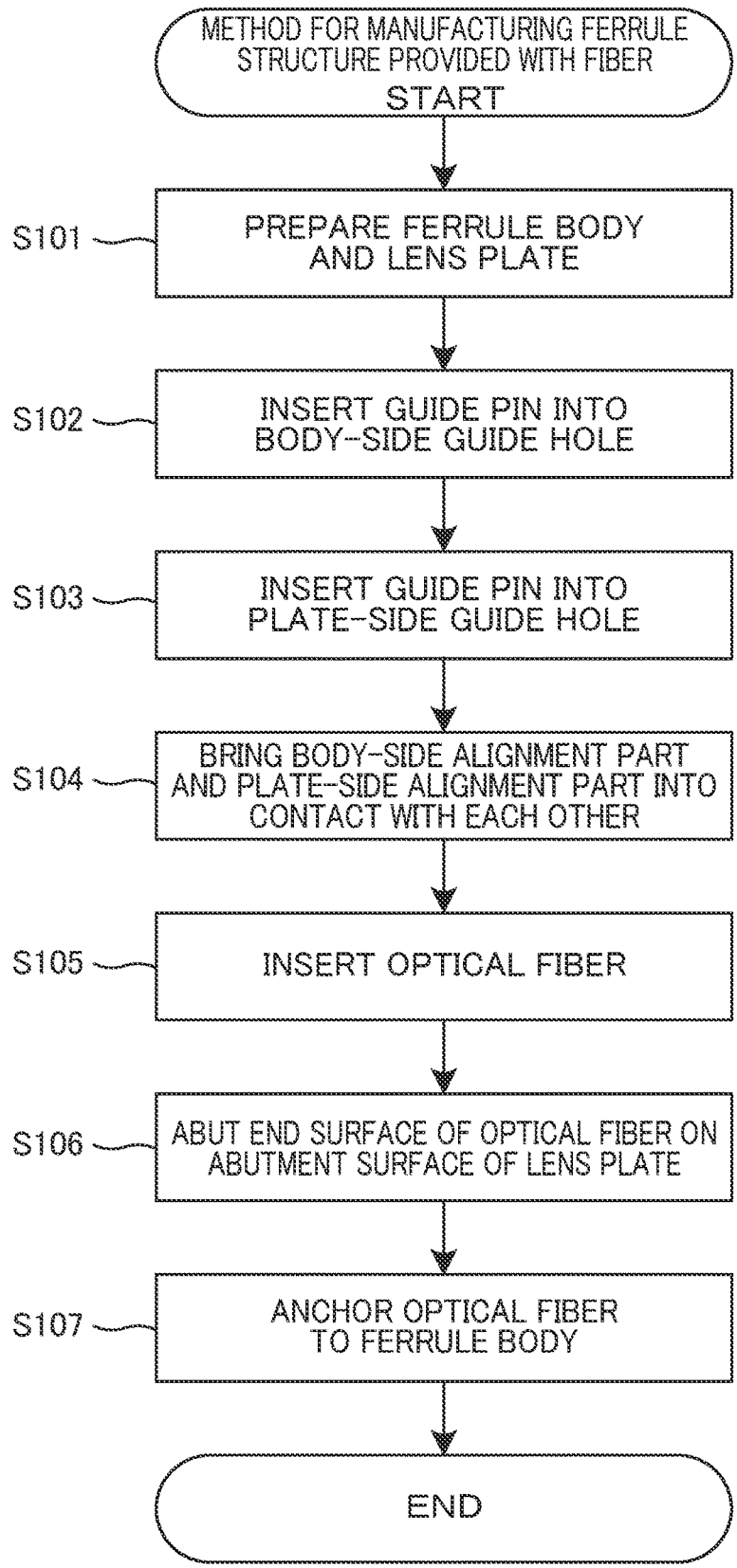
FIG. 5 is a flowchart of a method for manufacturing (a procedure for assembling) the ferrule structure 10 with a fiber of one or more embodiments.

FIG. 5 is a flowchart of a method for manufacturing (a procedure for assembling) the ferrule structure 10 equipped with a fiber of one or more embodiments. FIG. 6A to FIG. 6D are explanatory views illustrating a state in which the fiber holes 22 of the ferrule body 11 and the lens parts 33 of the lens plate 12 of one or more embodiments are positioned with each other. Note that FIG. 6A to FIG. 6D illustrate states in S103 and S104 in FIG. 5. FIG. 6B and FIG. 6D are cross-sectional views taken along a plane perpendicular to the left-right direction at a position of the central axis of the guide pin 13B.

First, an operator prepares the ferrule body 11 and the lens plate 12 (S101). The operator also prepares the guide pins 13 for a next step. The operator also prepares a jig or the like for assembling the ferrule body 11 and the lens plate 12 as necessary.

Subsequently, the operator inserts the guide pins 13 into the body-side guide holes 21 so that the fiber holes 22 of the ferrule body 11 and the lens parts 33 of the lens plate 12 are positioned with each other via the guide pins (S102). At this moment, the guide pin 13A is inserted into the body-side guide hole 21A, and the guide pin 13B is inserted into the body-side guide hole 21B. As described above, the body-side guide hole 21A is formed so that the guide pin 13A is fitted thereinto. The body-side guide hole 21B is formed so that the guide pin 13B is fitted thereinto. Thus, when the guide pin 13A is inserted into the body-side guide hole 21A, the guide pin 13A is fitted into the body-side guide hole 21A. When the guide pin 13B is inserted into the body-side guide hole 21B, the guide pin 13B is fitted into the body-side guide hole 21B.

The operator inserts the guide pins 13 into the plate-side guide holes 32 so that the fiber holes 22 of the ferrule body 11 and the lens parts 33 of the lens plate 12 are positioned with each other via the guide pins (S103). At this moment, the guide pin 13A is inserted into the plate-side guide hole 32A, and the guide pin 13B is inserted into the plate-side guide hole 32B. As described above, the plate-side guide hole 32A is formed so that the guide pin 13A is fitted thereinto. Thus, when the guide pin 13A is inserted into the plate-side guide hole 32A, the guide pin 13A is fitted into the plate-side guide hole 32A.

As described above, the plate-side guide hole 32B is formed to have a diameter greater than the diameter for fitting of the guide pin 13B. Thus, as illustrated in FIG. 6A and FIG. 6B, when the guide pin 13A and the guide pin 13B are merely inserted into the plate-side guide hole 32A and the plate-side guide hole 32B, respectively, there is a space around the outer circumference of the guide pin 13B on the plate-side guide hole 32B side while the guide pin 13A is in a fitted state on the plate-side guide hole 32A side. Thus, the lens plate 12 is rotatable with respect to the ferrule body 11 about the central axis of the plate-side guide hole 32A.

In view of this, the operator brings the ferrule body 11 and the lens plate 12 closer to each other relatively, and thus brings the body-side positioning part 25 and the plate-side positioning part 40 into contact with each other (S104). With this, as illustrated in FIG. 6C and FIG. 6D, the lens plate 12 can be positioned with the ferrule body 11 in the front-rear direction and the up-down direction. With this, the rotation direction of the lens parts 33 of the lens plate 12 with respect to the fiber holes 22 of the ferrule body 11 about the central axis of the plate-side guide hole 32A (the body-side guide hole 21A) is regulated, and placement is performed. There is a space around the outer circumference of the guide pin 13B in the plate-side guide hole 32B, and hence contact between the body-side positioning part 25 and the plate-side positioning part 40 determines the positional relationship between the ferrule body 11 and the lens plate 12 in the up-down direction within the range of the space.

Note that the contact state between the body-side positioning part 25 and the plate-side positioning part 40 may be maintained by setting the ferrule structure 10, in which the ferrule body 11 the lens plate 12 are attached to each other via the guide pins 13, to a jig.

When the fiber holes 22 of the ferrule body 11 are positioned with the lens parts 33 of the lens plate 12 in S104, the positional relationship between the ferrule body 11 and the lens plate 12 is in a state illustrated in FIG. 6C and FIG. 6D. At this moment, due to the bottom part 41 of the lens plate 12, the gap is formed between the lens plate 12 and the ferrule body 11. The abutment surface 36 of the lens plate 12 faces the openings of the fiber holes 22 of the ferrule body 11.

Next, the operator inserts each of the optical fibers 1 of the optical fiber ribbon into each of the fiber holes 22 of the ferrule body 11 (S105). Before inserting the optical fibers 1, the operator cuts the end face of each of the optical fibers 1 of the optical fiber ribbon. The end faces of the optical fibers 1 may be cut by using a laser, may be cut mechanically with a blade, or may be cut through polishing. After cutting the end faces of the optical fibers 1, the operator inserts the respective optical fibers 1 of the optical fiber ribbon into the respective fiber holes 22 of the ferrule body 11. Then, the optical fibers 1 protrude from the front end surface 20 (the opening surface of the fiber holes 22) of the ferrule body 11. In this stage, however, the end faces of the optical fibers 1 do not abut the abutment surface 36 of the lens plate 12. This is because dust and the like may adhere to the end faces of the optical fibers 1 when the optical fibers 1 pass through the fiber holes 22.

Note that, before S106 (abutment processing) and S107 (optical fiber keeping processing) described later, the end faces of the optical fibers 1 may be cleaned (not illustrated). For example, the operator blows air to blow off dust adhering to the end faces of the optical fibers 1 protruding from the front end surface 20 of the ferrule body 11. In this way, dust on the end faces of the optical fibers 1, which adheres thereon when the optical fibers 1 are inserted into the fiber holes 22 (S105), can be removed.

Subsequently, the operator further inserts the optical fibers 1, and causes the end faces of the optical fibers 1 to abut the abutment surface 36 of the lens plate 12 (S106). Note that, in one or more embodiments, the operator inserts a boot into the fiber insertion opening 23. A boot, however, does not have to be inserted into the fiber insertion opening 23.

Note that in S104 (placement performed with the body-side positioning part 25 and the plate-side positioning part 40) described above, the lens parts 33 of the lens plate 12 are positioned with the fiber holes 22 of the ferrule body 11 in the front-rear direction. At this moment, due to manufacturing errors of the body-side positioning part 25 and the plate-side positioning part 40, the position of the lens plate 12 may be deviated from the position of the ferrule body 11 in the front-rear direction. However, in one or more embodiments, in S106 (abutment processing) described above, the optical fibers 1 are inserted until the end faces of the optical fibers 1 abut the abutment surface 36. Thus, the distance from the end faces of the optical fibers 1 to the lens surfaces of the lens parts 33 is not changed even when the position of the lens plate 12 is deviated from the position of the ferrule body 11 in the front-rear direction. Therefore, such misalignment of the lens plate 12 from the ferrule body 11 in the front-rear direction is allowed.

Subsequently, the operator keeps the optical fibers 1 to the ferrule body 11 (S107). In the optical fiber keeping processing in S106, first, the operator fills the adhesive in the adhesive filling part 24 of the ferrule body 11. With this, the adhesive is applied between the inner wall surface of the adhesive filling part 24 and the optical fibers 1. When the adhesive fills the adhesive filling part 24, the adhesive permeates between the inner wall surfaces of the fiber holes 22 and the optical fibers 1. Then, the operator fills the adhesive functioning as a refractive index matching material through the upper opening of the bottom part 41. When the adhesive functioning as a refractive index matching material fills the bottom part 41 in S107, the adhesive permeates through a minute gap between contact surfaces of the ferrule body 11 and the lens plate 12. With this, when the adhesive is cured, the ferrule body 11 and the lens plate 12 can be bonded and fixed to each other. This facilitates an operation of bonding and fixing the ferrule body 11 and the lens plate 12 to each other. Finally, the operator cures the adhesive. When an ultraviolet curing resin is used as the adhesive, the operator applies ultraviolet rays. Alternatively, when an ultraviolet curing resin is used as the adhesive, the operator applies heat.

Others

In the embodiments described above, the body-side guide hole 21A and the plate-side guide hole 32A are formed so that the guide pin 13A is fitted thereinto. The body-side guide hole 21B is formed so that the guide pin 13B is fitted thereinto, and the plate-side guide hole 32B is formed to have a diameter greater than the diameter for fitting of the guide pin 13B. The fitting state of the guide pin 13A and the fitting state of the guide pin 13B, however, may be inverted. Specifically, the body-side guide hole 21B and the plate-side guide hole 32B may be formed so that the guide pin 13B is fitted thereinto, and the body-side guide hole 21A may be formed so that the guide pin 13A is fitted thereinto. Further, the plate-side guide hole 32A may be formed to have a diameter greater than the diameter for fitting of the guide pin 13A. With this, even when the pitch for the plate-side guide hole 32 (the plate-side guide hole 32B) for inserting the other guide pin 13 (the guide pin 13A) does not match with the pitch for the body-side guide hole 21 (the body-side guide hole 21A), misalignment between the fiber holes 22 of the ferrule body 11 and the lens parts 33 of the lens plate 12 can also be suppressed.

The plate-side guide hole 32B may be formed so that the guide pin 13B is fitted thereinto, and the body-side guide hole 21B may be formed to have a diameter greater than the diameter for allowing fitting of the guide pin 13B. With this, even when the pitch for the body-side guide hole 21 (the body-side guide hole 21A) for inserting the other guide pin 13 (the guide pin 13A) does not match with the pitch for the plate-side guide hole 32 (the plate-side guide hole 32B), misalignment between the fiber holes 22 of the ferrule body 11 and the lens parts 33 of the lens plate 12 can also be suppressed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
3: End face;
10, 100: Ferrule structure;
11: Ferrule body;
12: Lens plate;
13A: Guide pin (first guide pin);
13B: Guide pin (second guide pin);
20: Front end surface;
21A: Body-side guide hole (first body-side guide hole);
21B: Body-side guide hole (second body-side guide hole);
22: Fiber hole;
23: Fiber insertion opening;
24: Adhesive filling part;
25A, 25B: Body-side positioning part;
30: Front end surface;
32A: Plate-side guide hole (first plate-side guide hole);
32B: Plate-side guide hole (second plate-side guide hole);
33: Lens part
34: Lens arrangement part;
36: Abutment surface;
40A, 40B: Plate-side positioning part;
41: Bottom part.

The invention claimed is:

1. A ferrule comprising:
a ferrule body comprising:
   a first body-side guide hole into which a first guide pin is inserted;
   a second body-side guide hole into which a second guide pin is inserted; and
   an optical fiber holder that holds an optical fiber; and
a lens plate comprising:
   a first plate-side guide hole into which the first guide pin is inserted;
   a second plate-side guide hole into which the second guide pin is inserted;
   a lens part; and
   an abutment surface that an end face of the optical fiber abuts, wherein
the first guide pin fits the first body-side guide hole and the first plate-side guide hole,
the second guide pin fits one of the second body-side guide hole or the second plate-side guide hole,
the other one of the second body-side guide hole and the second plate-side guide hole has a diameter greater than a diameter of a hole fitted by the second guide pin,
the ferrule body comprises a body-side positioner,
the lens plate comprises a plate-side positioner, and
when the body-side positioner contacts the plate-side positioner, the lens plate is positioned with respect to the ferrule body in a direction perpendicular to a plane including a central axis of the first plate-side guide hole and a central axis of the second plate-side guide hole.

2. The ferrule according to claim 1, wherein
the second guide pin fits the second body-side guide hole, and
the second plate-side guide hole has a diameter greater than a diameter of the second body-side guide hole.

3. A fiber-equipped ferrule, comprising:
an optical fiber;
a ferrule body comprising:
   a first body-side guide hole into which a first guide pin is inserted;
   a second body-side guide hole into which a second guide pin is inserted; and
   an optical fiber holder that holds an optical fiber; and
a lens plate comprising:
   a first plate-side guide hole into which the first guide pin is inserted;
   a second plate-side guide hole into which the second guide pin is inserted;
   a lens part; and
   an abutment surface that an end face of the optical fiber abuts, wherein
the first guide pin fits the first body-side guide hole and the first plate-side guide hole,
the second guide pin fits one of the second body-side guide hole or the second plate-side guide hole,
the other one of the second body-side guide hole and the second plate-side guide hole has a diameter greater than a diameter of a hole fitted by the second guide pin,
the ferrule body comprises a body-side positioner,
the lens plate comprises a plate-side positioner, and
when the body-side positioner contacts the plate-side positioner, the lens plate is positioned with respect to the ferrule body in a direction perpendicular to a plane including a central axis of the first plate-side guide hole and a central axis of the second plate-side guide hole.

* * * * *